(12) United States Patent
Satish et al.

(10) Patent No.: US 7,729,342 B1
(45) Date of Patent: Jun. 1, 2010

(54) PRIVACY PRESERVATION FOR VOICE OVER INTERNET PROTOCOL CALLING

(75) Inventors: Sourabh Satish, Mountain View, CA (US); Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 192 days.

(21) Appl. No.: 11/293,858

(22) Filed: Dec. 2, 2005

(51) Int. Cl.
*H04L 12/66* (2006.01)
(52) U.S. Cl. .................. 370/352; 370/329; 709/219; 379/201.11
(58) Field of Classification Search .......... 709/224, 709/219, 225; 370/329, 352, 353, 354, 355, 370/356; 379/201.11
See application file for complete search history.

(56) References Cited

U.S. PATENT DOCUMENTS

| | | | |
|---|---|---|---|
| 6,157,829 A * | 12/2000 | Grube et al. ............. 455/414.1 |
| 6,327,353 B1 * | 12/2001 | Fukuzawa et al. ....... 379/201.01 |
| 7,020,256 B2 * | 3/2006 | Jain et al. ............... 379/201.02 |
| 2003/0076819 A1 * | 4/2003 | Emerson, III ................ 370/352 |
| 2003/0109272 A1 * | 6/2003 | Mousseau et al. ........... 455/517 |
| 2003/0147519 A1 * | 8/2003 | Jain et al. ............... 379/211.02 |
| 2004/0023664 A1 * | 2/2004 | Mirouze et al. .......... 455/456.1 |
| 2004/0101123 A1 * | 5/2004 | Garcia .................... 379/220.01 |
| 2004/0162892 A1 * | 8/2004 | Hsu .......................... 709/221 |
| 2005/0018657 A1 * | 1/2005 | Nakao et al. ................. 370/352 |
| 2005/0204162 A1 * | 9/2005 | Rayes et al. ................. 713/201 |

* cited by examiner

*Primary Examiner*—Fan Tsang
*Assistant Examiner*—Simon King
(74) *Attorney, Agent, or Firm*—Hunton & Williams LLP

(57) ABSTRACT

Privacy preservation for voice over internet protocol calling is disclosed. A request is received to associate with a current or potential call participant a temporary privacy address that is valid for a prescribed period or until the occurrence of a prescribed event or condition. A request is received to process a call using the temporary privacy address. A determination is made as to whether the temporary privacy address is currently valid, and if it is currently valid, the call is processed using the temporary privacy address.

18 Claims, 6 Drawing Sheets

PRIVACY PRESERVATION FOR VOICE OVER INTERNET PROTOCOL CALLING

BACKGROUND OF THE INVENTION

There are occasions when identifying information (for example, a phone number) is required during a business or other interaction. For example, when a seller advertises an item for sale, a method for contacting the seller—such as a phone number—is required and made public to a potential buyer. However, after the item is sold, a seller may no longer want potential buyers and others who may have obtained a phone number or other address made public to facilitate the sale to be able to contact the seller. Similarly, when contacting a business or other destination in order to inquire for product information and/or other purposes, identifying information—such as a phone number as displayed by caller ID—typically is made available to the called party. After the desired product information has been received and/or the desired interaction otherwise completed, in some circumstances it is no longer preferable that the business or other called party be able to contact the caller. Therefore, it would be useful to be able to preserve privacy so that the identifying information, such as a phone number, is able to be used for contact only when it is desirable.

BRIEF DESCRIPTION OF THE DRAWINGS

Various embodiments of the invention are disclosed in the following detailed description and the accompanying drawings.

DETAILED DESCRIPTION

Figure 1:
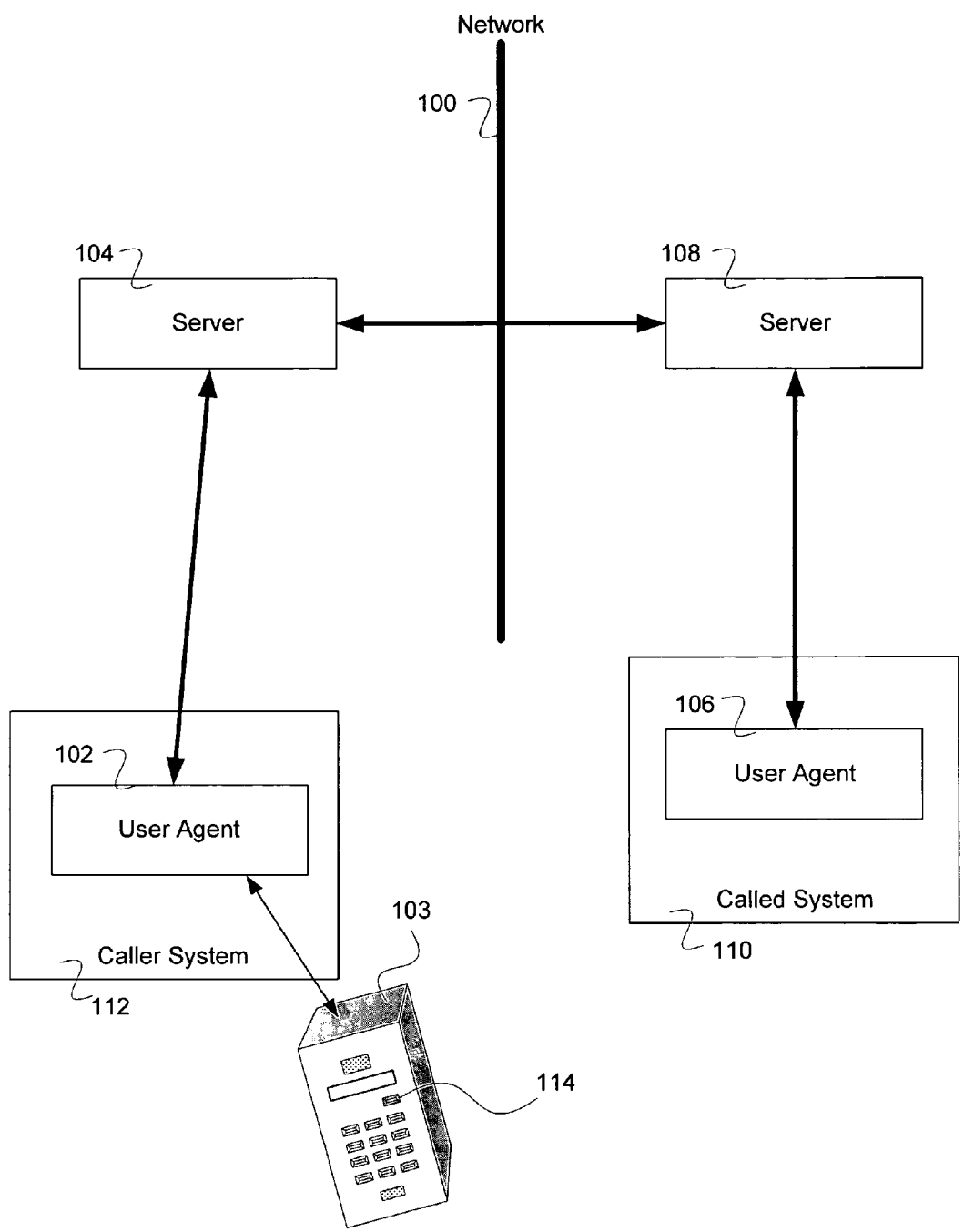
FIG. 1 is a block diagram illustrating an embodiment of a system for privacy preservation for voice over interne protocol (VoIP) calling.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Privacy preservation for voice over interne protocol calling is disclosed. A request is received to associate with a call destination a temporary privacy address that is valid for a prescribed period or until the occurrence of a prescribed event or condition. A request is received to process a call using the temporary privacy address. A determination is made as to whether the temporary privacy address is currently valid, and if it is currently valid, the call is processed using the temporary privacy address. In some embodiments, a user requests a temporary privacy address to be able to display the temporary privacy address in an advertisement; the temporary privacy address can be used to respond to the advertisement for a prescribed period of time (for example, for one week) or until the occurrence of a prescribed event or condition (for example, the sale of an item in the advertisement). In some embodiments, the temporary privacy address has one or more policies associated with it: for example, a call to the temporary privacy address may be redirected to voice mail and/or some other secondary destination at certain times and/or after a specified period. In some embodiments, the user is informed that an incoming call is using the temporary privacy address. In some embodiments, a user requests a temporary privacy address to be able to make a call; the temporary privacy address can be used to return a call to the user for a prescribed period of time (for example, for that day) or until the occurrence of a prescribed event or condition (for example, until the user decides that it is no longer desirable to be contacted).

FIG. 1 is a block diagram illustrating an embodiment of a system for privacy preservation for voice over interne protocol (VoIP) calling. In the example shown, caller system 112 includes user agent client 102. User agent 102 is associated with a handset or other telephone equipment which is represented in FIG. 1 by handset 103. In various embodiments, user agent 102 comprises and/or is associated with a soft phone, a hard phone, a phone comprising a combination of hardware and software, or any other device and/or combination of devices appropriate for VoIP calling. In various embodiments, user agent 102 includes and/or is responsive to a button (for example, button 114 on handset 103), a menu command, a key sequence, a voice command, or any other appropriate input that automatically obtains and/or generates and/or registers, or triggers a request to obtain, to generate, or to register a temporary privacy address. Server 104 is connected to caller system 112. In some embodiments, server 104 is connected to a plurality of user agents (not shown in FIG. 1). In some embodiments, server 104 comprises a proxy server associated with one or more user agents associated with a domain and/or service provider with which the server 104 is associated, e.g., a session initiation protocol (SIP) proxy server as described in Internet Engineering Task Force (IETF) Request for Comments (RFC) 3261 dated June 2002. In various embodiments, user agent 102 resides on the same or on a different host than server 104. Caller system 112 connects to server 104 via a network connection. In various embodiments, the network connection is a local area network, a wide area network, the Internet, or any other appropriate wired or wireless network. In some embodiments, user agent 102 comprises a user agent configured to act as a client with respect to calls initiated using handset 103 and as a server with respect to calls to a VoIP identifier (e.g., a SIP URI) with which the user agent 102 is associated.

In some embodiments, server 104 receives requests from user agent 102 to associate a temporary privacy address with user agent 102; to generate, obtain, and/or register a temporary privacy address; to locate a server associated with a called address; and/or to process a call using a temporary privacy address. In various embodiments, server 104 comprises one or more physical hosts and/or logical entities (e.g., servers) each configured to perform one or more of the functions described herein as being performed by server 104. For example, in some embodiments separate physical and/or logical servers are used to perform one or more of generating, obtaining, and/or registering a temporary privacy address; locating a server associated with a called address; and/or processing a call using a temporary privacy address. In some embodiments, user agent 102 requests a call using a provided temporary privacy address as the destination or called address or number (for example, a phone number in an advertisement).

Server 104 is connected to network 100 which includes network elements involved in the communication path at any particular phase of the communication. In various embodiments, network 100 comprises one or more of a local area network, a wide area network, the Internet, a wired network, a wireless network, or any other network appropriate for carrying a VoIP call. Network 100 in FIG. 1 is also connected to server 108. Server 108 is connected to called system 110. Called system 110 includes user agent server 106. In various embodiments, user agent 106 comprises a hard or soft phone and/or a combination thereof and/or associated equipment. In some embodiments, server 108 includes the ability to connect VoIP initiated calls to numbers and/or other identifiers associated with other phone networks including wired telephone networks, wireless telephone networks, local phone networks, local phone exchanges, or any other network for connecting telephone calls. In some embodiments, server 108 is connected to a plurality of user agent servers (not shown in FIG. 1), e.g., a plurality of user agents associated with a service provider and/or domain with which the server 108 is associated.

In some embodiments, server 108 receives a request to call a called address (e.g., a SIP URI) associated with user agent server 106. In some embodiments, a user agent 106 registers its association with an address (e.g., a SIP URI), for example in response to receiving an indication that a user with which the address is associated has logged in at an equipment on which the user agent 106 is running and/or otherwise indicated the user is available and/or desires to receive calls via the user agent 106, by contacting a registrar or other server included in and/or associated with server 108. Server 108 locates one or more user agent servers currently associated with an address (e.g., SRI URI) being called, e.g., by querying a location service included in and/or accessed by server 108, and based on the location information processes the requested call by facilitating the establishment of a connection and/or session between user agent 102 and user agent 106. In some embodiments, in the case where the called party had requested the temporary privacy address in order to be called (for example, by placing the temporary privacy address in an advertisement), called system 110 and/or user agent server 106 is notified of the temporary privacy address being used to make the call (the address being called to). In some embodiments, in the case where the calling party had requested the temporary privacy address in order to make a call (for example, when requesting information from a business and not desiring later marketing calls), called system 110 and/or user agent 106 is notified of the temporary privacy address being used to make the call (the address being called from), e.g., in connection with a "caller ID" type of functionality.

In some embodiments, once a call session is established via servers 104 and 108, all or part of the call data is exchanged through network communications between the user agents 102 and 106 made other than through servers 104 and/or 108, e.g., through network communications addressed by each of user agents 102 and 106 to the other using a suitable transport protocol such as the Real-time Transport Protocol (RTP).

Figure 2:
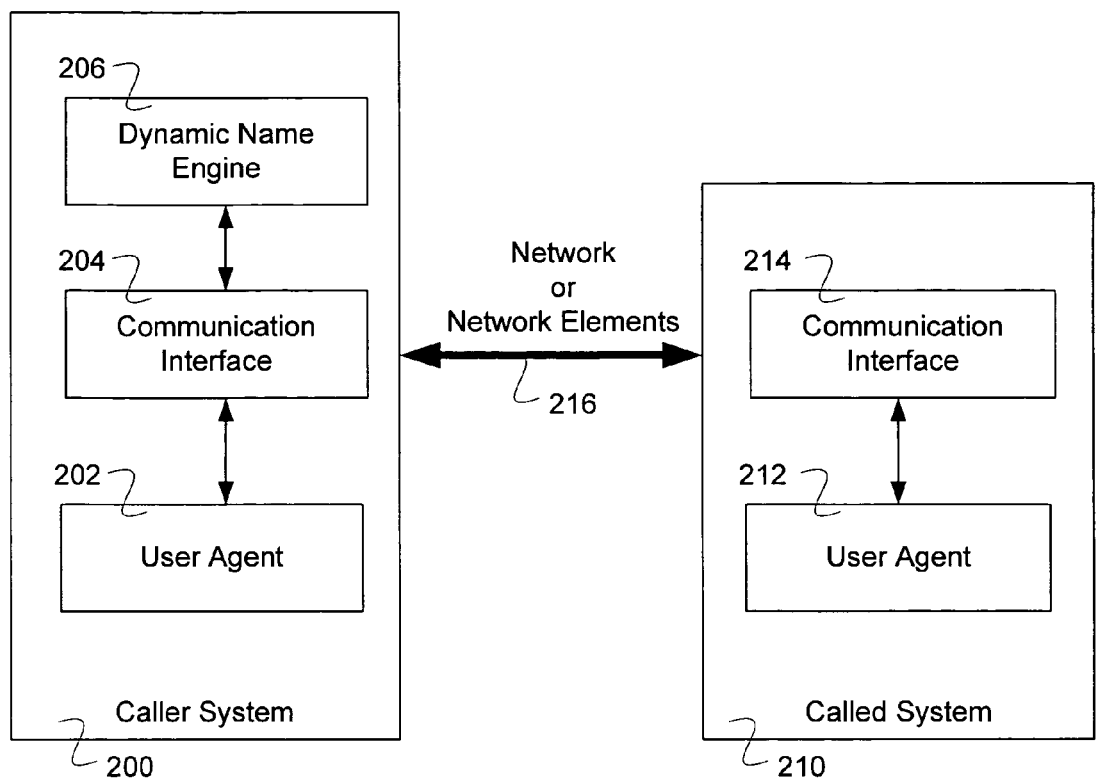
FIG. 2 is a block diagram illustrating an embodiment of a system for privacy preservation for VoIP calling.

FIG. 2 is a block diagram illustrating an embodiment of a system for privacy preservation for VoIP calling. In the example shown, caller system 200 includes user agent 202, communication interface 204, and dynamic name engine 206. In various embodiments, caller system 200 is implemented using one piece of hardware (for example, an internet phone), several pieces of hardware, a combination of one or more hardware pieces and one or more software pieces, or several software pieces running on a computer or other system capable of supporting the software pieces. In various embodiments, one or more of the elements of caller system 200 is/are associated with an individual calling party (e.g., a user) and/or or with a service provider with which a calling user and/or equipment and other users and/or equipment are associated. Called system 210 includes user agent 212 and communication interface 214. In various embodiments, called system 210 is implemented using one piece of hardware (for example, an internet phone), several pieces of hardware, a combination of one or more hardware pieces and one or more software pieces, or several software pieces running on a computer or other system capable of supporting the software pieces. In various embodiments, one or more of the elements of called system 210 is/are associated with an individual called party (e.g., a user) and/or with a service provider with which a called user and/or equipment and other users and/or equipment are associated.

A user interfaces with user agent 202 to request a call. In various embodiments, user agent 202 is configured to receive from a user, e.g., via a user interface, a request to obtain and register a temporary privacy address and process the request by obtaining (or generating) and registering such an address, including by defining and associating with the address any parameters and/or policies indicated by the user, such a time period during with the temporary privacy address is to be usable to reach the user and/or a policy regarding how calls placed to the temporary privacy address should be processed once the temporary privacy address is no longer a valid address for the user, e.g., a policy designating one or more destinations to which calls to the temporary privacy address should be redirected (e.g., voice-mail) and/other responsive action (reject calls, alert user, etc.). In various embodiments, user agent 202 is configured to process requests to place a call using a temporary privacy address (existing and/or newly obtained and/or generated) as the caller's address for such features as caller ID. In various embodiments, user agent 202 is configured to process requests to initiate a call to a temporary privacy address. User agent 202 communicates with communication interface 204 to find and connect to called system 210. Communication interface 204 locates appropriate inbound proxy server 214 of called system 210 using dynamic name engine 206. Communication interface 204 contacts communication interface 214 and requests to locate called party. In some embodiments, user agent 212 had previously been employed to register a VoIP address (for example, a SIP URI). Communication interface 214 locates called party using a location service and connects caller party (associated with user agent 202) and called party (associated with user agent 212) for a VoIP call. In various embodiments, the location service is a part of the called system, a part of the caller system, or a part of or a stand alone system connected by a network connection to the caller and/or the called system.

Figure 3:
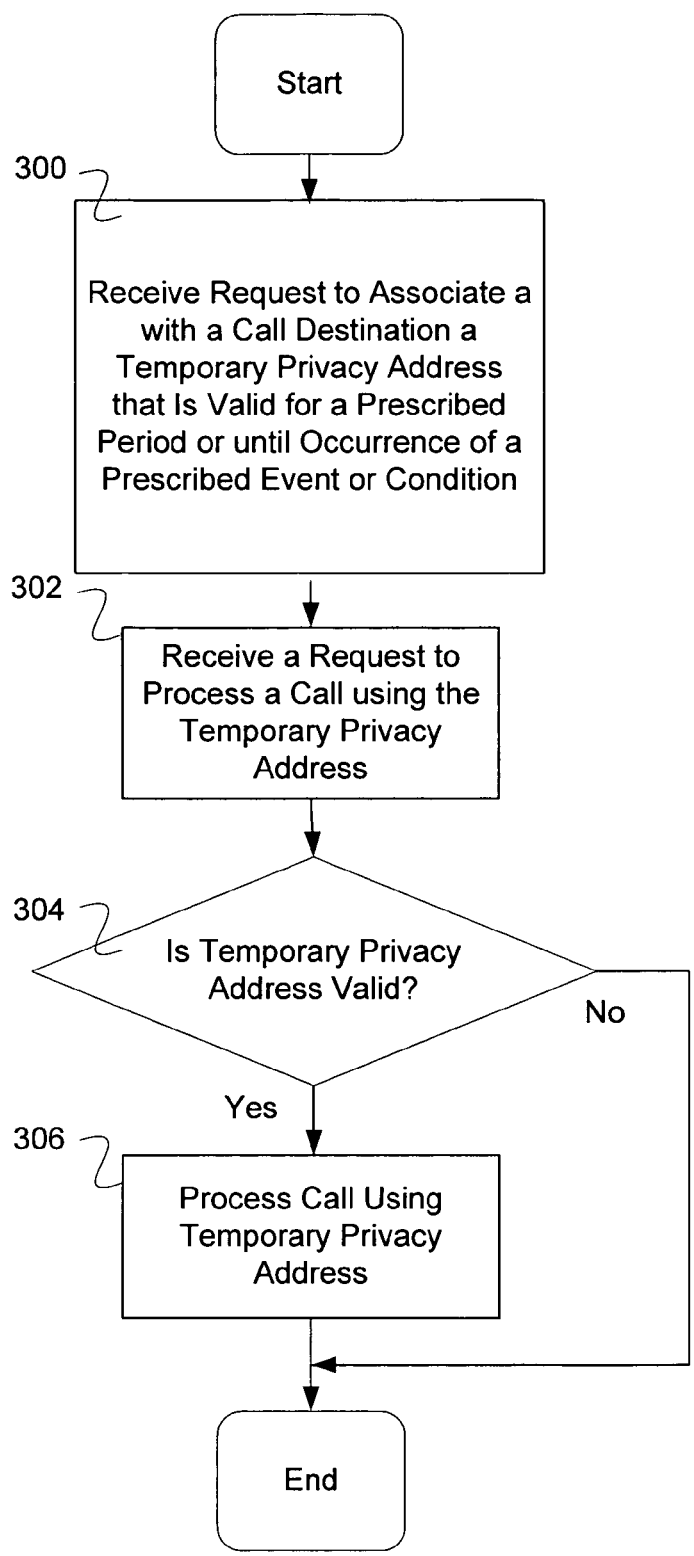
FIG. 3 is a flow chart illustrating an embodiment of a process for privacy preservation for VoIP calling.

FIG. 3 is a flow chart illustrating an embodiment of a process for privacy preservation for VoIP calling. In the example shown, in 300 a request is received to associate with a call destination (e.g., a user, equipment, etc.) a temporary privacy address that is valid for a prescribed period or until occurrence of a prescribed event or condition. In various embodiments, the request comprises a request for a temporary privacy address to be used to place calls to the call destination with which the temporary privacy address is associated (for example, a phone number is placed in an advertisement) and/or a request is for a temporary privacy address to be used as a calling station (e.g., return) address when placing a call (for example, a phone number is used to call a business in order to obtain information, but without the possibility of being called back for marketing or other undesired purposes once the temporary privacy address is no longer valid). In 302, a request is received to process a call using the temporary privacy address. In 304, it is determined if the temporary privacy address is valid. The temporary privacy address may no longer be valid after a certain period of time or after the occurrence of an event or condition. If the temporary privacy address is no longer valid, then the process ends. In some embodiments, the initiator of a call placed using a temporary privacy address (either as the source or destination address) receives a notification if it is determined in 304 that the temporary privacy address is not currently valid. If the temporary privacy address is valid, then in 306 the call is processed using the temporary privacy address. If the call was placed to the temporary privacy address, in 306 the call is completed by facilitating establishment of a call session between the calling party and a destination with which the temporary privacy address is associated. If the call was placed by a calling party indicating a desire to use the temporary privacy address as a return or "caller ID" address for the calling party, in 306 the call is completed by facilitating establishment of a connection to a called party to which the calling party has requested to connect.

Figure 4:
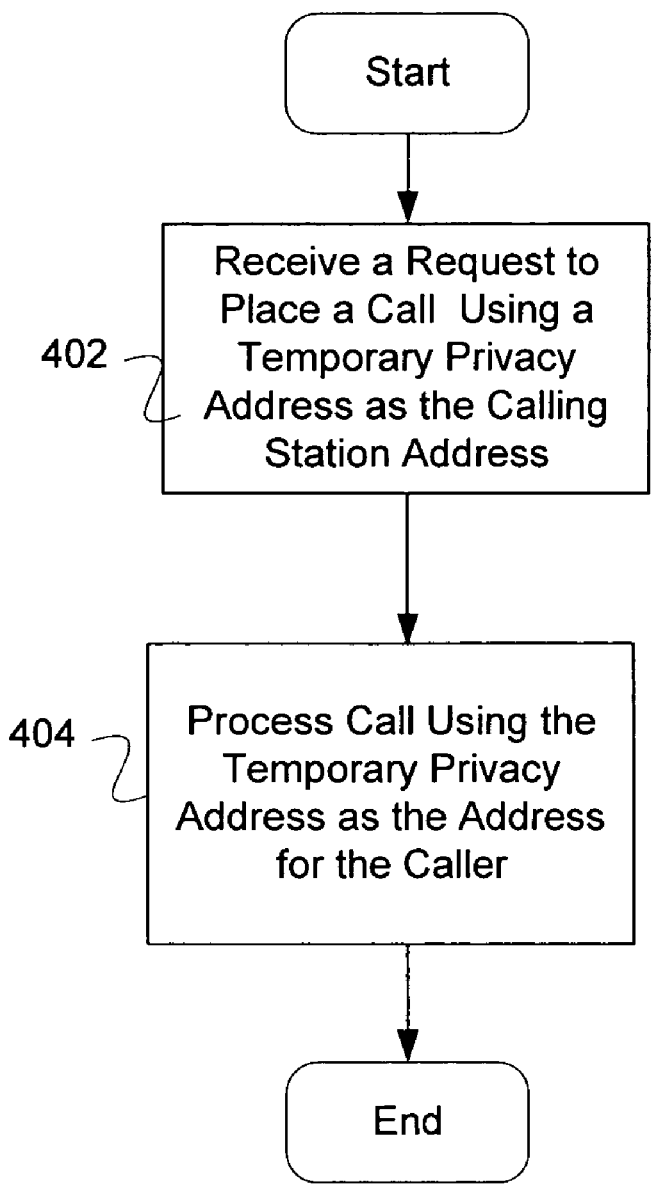
FIG. 4 is a flow chart illustrating an embodiment of a process for privacy preservation for VoIP calling.

FIG. 4 is a flow chart illustrating an embodiment of a process for privacy preservation for VoIP calling. In various embodiments, the process of FIG. 4 is implemented on a calling system and/or device and/or one or more systems, such as one or more proxy and/or other servers, associated with a VoIP service provider with which the calling user, subscriber, system, equipment, etc. is associated. In the example shown, at 402 a request is received to place a call using a temporary privacy address as the calling station address. In 404, the call is processed using the temporary privacy address as the address for the caller. In some embodiments, the temporary privacy address is requested by the caller—for example, when a caller wants to call a business but preserve privacy in that the caller does not receive return calls (because the business has logged the caller ID of the incoming call) for marketing purposes. In some embodiments, the temporary privacy address is requested by a user entering an input at a calling equipment and/or system being used to place the call. In various embodiments, the temporary privacy address is generated and/or obtained and associated with the calling station, e.g., by mapping the temporary privacy address to a primary (e.g., more permanent) address associated with the calling station (e.g., a primary VoIP SIP URI associated with the calling user), by one or more of a calling equipment and/or system used to place the call and/or one or more servers or other systems and/or equipment associated with a VoIP server provider with which the calling station is associated. In some embodiments, the temporary privacy address desired to be used is included and/or identified in the request received at 402. In various embodiments, the temporary privacy address is generated, obtained, and/or associated with the calling station in response to the request received at 402. In some embodiments, 404 includes using the temporary privacy address as a return address for the calling station for such services such as caller identification.

Figure 5:
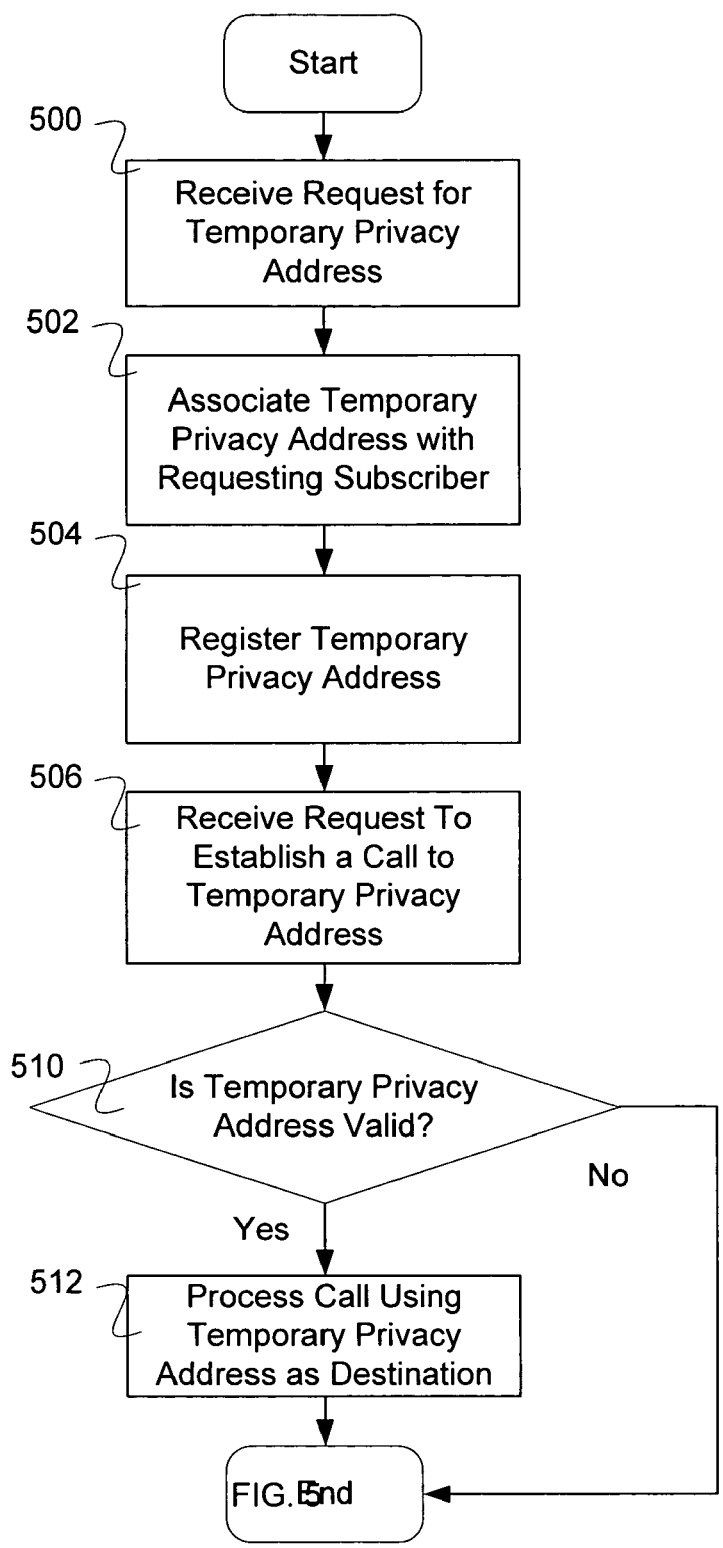
FIG. 5 is a flow chart illustrating an embodiment of a process for privacy preservation for VoIP calling.

FIG. 5 is a flow chart illustrating an embodiment of a process for privacy preservation for VoIP calling. In some embodiments, the process of FIG. 5 is implemented at least in part on an inbound SIP proxy server. In the example shown, in 500 a temporary privacy address is requested. In some embodiments, the request for a temporary privacy address is made by a subscriber or other user who wants to be able to provide the temporary privacy address to one or more potential callers to allow such potential callers to reach the subscriber for a limited period, or until occurrence of a specified event and/or other criteria, but not after. For example, the subscriber or other user may want to advertise a phone number in an advertisement and only wants the number to be used during the time when the advertisement is active. In 502, the temporary privacy address is associated with the requesting subscriber, e.g., by mapping the temporary privacy address to a primary address associated with the subscriber. In 504 the temporary privacy address is registered with a location service. In some embodiments, 504 includes informing the location service that a subscriber with which the temporary privacy address is associated is currently receiving calls at a specified location (e.g., at a system or other equipment associated with a specified IP address). In some embodiments, the temporary privacy address is registered by a user, subscriber, system, equipment, etc. with which the temporary privacy address is associated. In some embodiments, the temporary privacy address is not registered and an inbound proxy server associated with the subscriber with which the temporary privacy address is associated is configured to map the temporary privacy address to a permanent or other address associated with the subscriber, which permanent or other address is registered with the location service. In 506, a request is received to establish a call with the temporary privacy address indicated as the call destination address. In 510, it is determined if the temporary privacy address is valid. If the address is not valid, then the process ends. If the temporary privacy address is valid, at 512 the call is processed using the temporary privacy address as the address for the called party. In some embodiments, 512 includes mapping the temporary privacy address to an associated primary (e.g., permanent) or other address for a user, subscriber, system, and/or equipment with which the temporary privacy address is associated, using the primary or other address—e.g., by querying a location service—to locate a network connected resource (e.g., a host system) associated with the primary or other address, and facilitating establishment of a communication session between the calling party and the called party at the network connected resource with which the primary or other number is associated without disclosing to the calling party the primary or other number used to locate the called party with whom/which the temporary privacy address is associated.

Figure 6:
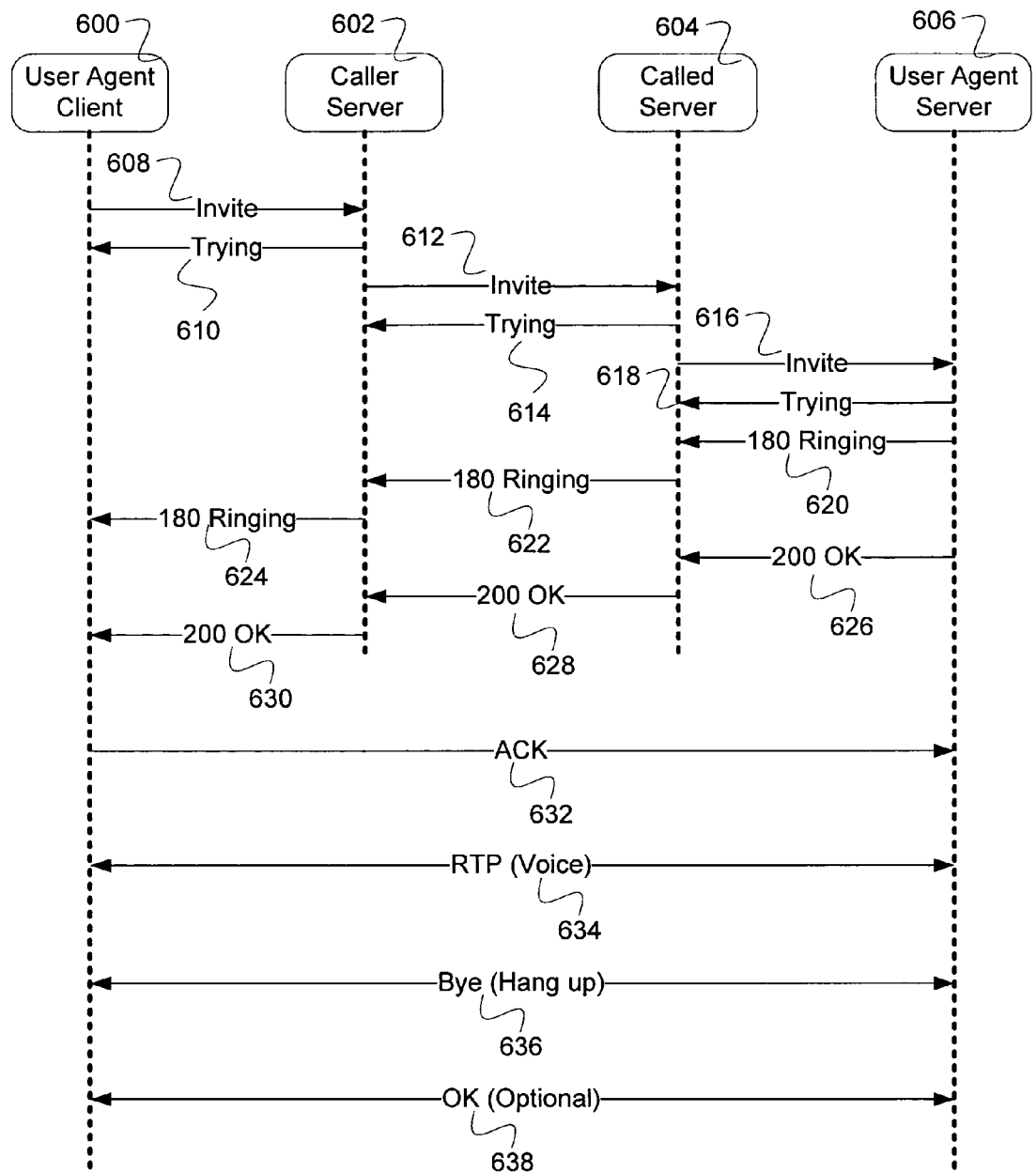
FIG. 6 illustrates an embodiment of a sequence of a process for a VoIP call.

FIG. 6 illustrates an embodiment of a sequence of a process for a VoIP call. In some embodiments, the process in FIG. 6 is used to implement 404 of FIG. 4 and/or 512 of FIG. 5. In the example shown, user agent client 600 begins processing a call to user agent server 606 by sending invitation 608 to caller server 602. Caller server 602 indicates that it is trying to process the call by sending trying 610 back to user agent client 600. Caller server 602 continues processing the call to user agent server 606 by sending invitation 612 to called server 604. In some embodiments, caller server 602 uses a domain name service to identify called server 604, e.g., by submitting a domain name query to locate called server 604 based at least in part on a domain name portion of a SIP URI indicated by the user agent client 600 as the address of the party to whom the call is being placed. Called server 604 indicates that it is trying to process the call by sending trying 614 back to caller server 602. Called server 604 continues processing the call to user agent server 606 by sending invitation 616 to user agent server 606. In some embodiments, called server 604 queries a location service, e.g., a registrar or similar entity or service, to obtain a location (e.g., IP address) for user agent server 606. User agent server 606 indicates that it is trying to process call by sending trying 618 to called server 604. Once a "ringing" or other indication that an incoming call has arrived is provided, e.g., by user agent server 606 and/or an associated process, system, and/or equipment, user agent server 606 indicates 180 ringing 620 to called server 604. Called server 604 indicates 180 ringing 622 to caller server 602. Caller server 602 indicates 180 ringing 624 to user agent client 600. In some embodiments, user agent client 600 does not wait for 180 ringing indication before providing a ringing tone or other indication to the caller. Once the called party accepts the call, e.g., by lifting an associated equipment "off hook" or otherwise indicating the recipient is accepting the call, user agent server 606 indicates 200 OK 626 to called server 604. Called server 604 indicates 200 OK 628 to caller server 602. Caller server 602 indicates 200 OK 630 to user agent client 600. As part of the 200 OK indications, user agent client server 606 advertises to user agent client 600 information that enables the completion of the call including codec information, phone attribute information, call preference information, and/or any other relevant information relevant to completion of the call.

User agent client 600 thereafter communicates directly with user agent server 606, i.e., not indirectly through caller server 602 and called server 604, by sending ACK 632 which includes parameter information for the call based at least in part on the information user agent server 606 advertised as part of the 200 OK indications. User agent client 600 and user agent server 606 proceed to talk on the call using a real time protocol (as indicated by RTP (voice) 634 in FIG. 6). The call terminates with bye (hang up) 436 indications exchanged between user agent client 400 and user agent server 406, which may be initiated by either side. In some embodiments, an acknowledgement message OK (optional) 438 is exchanged between user agent client 400 and user agent server 406.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for privacy preservation for voice over Internet protocol calling comprising:
   receiving, in connection with a request that a voice over internet protocol call be placed to a destination specified in the call request, a request to associate with a calling party that initiated the call request a temporary privacy address that is valid for a prescribed period or until occurrence of a prescribed event or condition and to provide the temporary privacy address to the destination, in place of a primary address associated with the calling party, as a calling station address in connection with connecting the call;
   assigning the temporary privacy address to the calling party, wherein the temporary privacy address is assigned in response to the call request and prior to connecting the call,
   informing the calling party, at the time of the call, of the temporary privacy address that has been assigned;
   connecting the call, including by providing the temporary privacy address to the destination as the calling station address; and sending a notification if a subsequent call is placed to the temporary privacy address at a time when the temporary privacy address is no longer valid.

2. The method as in claim 1, wherein the calling party includes one or more of the following: a user, a phone, and a computer or other system.

3. The method as in claim 1, further including registering the temporary privacy address with a location service.

4. The method as in claim 1, further including mapping the temporary privacy address to a primary or other address associated with the calling party.

5. The method as in claim 1, wherein the prescribed event includes one or more of the following: a predetermined time, a predetermined date, a predetermined time and date, completion of a sale or other transaction, and receipt of a notification from the call participant.

6. The method as in claim 1, further comprising applying a policy associated with the temporary privacy address.

7. The method as in claim 1, wherein a subsequent call placed to the temporary privacy address is routed to voice mail.

8. The method as in claim 1, further including routing to voice mail a subsequent call placed to the temporary privacy address if it is determined that the temporary privacy address is no longer valid.

9. The method as in claim 1, wherein a subsequent call placed to the temporary privacy address is routed to a primary or other address associated with the calling party.

10. A system for privacy preservation for voice over internet protocol calling comprising:
   a processor configured to:
      receive, in connection with a request that a voice over Internet protocol call be placed to a destination specified in the call request, a request to associate with a calling party that initiated the call request a temporary privacy address that is valid for a prescribed period or until occurrence of a prescribed event or condition and to provide the temporary privacy address to the destination, in place of a primary address associated with the calling party, as a calling station address in connection with connecting the call;
      assign the temporary privacy address to the calling party, wherein the temporary privacy address is assigned in response to the call request and prior to connecting the call;
      inform the calling party, at the time of the call, of the temporary privacy address that has been assigned; and
      connect the call, including by providing the temporary privacy address to the destination as the calling station address; and
   send a notification if a subsequent call is placed to the temporary privacy address at a time when the temporary privacy address is no longer valid; and
   a memory coupled to the processor and configured to store instructions for the processor.

11. A computer program product for privacy preservation for voice over Internet protocol calling, the computer program product being embodied in a computer readable medium and comprising computer instructions for:

receiving, in connection with a request that a voice over internet protocol call be placed to a destination specified in the call request, a request to associate with a calling party that initiated the call request a temporary privacy address that is valid for a prescribed period or until occurrence of a prescribed event or condition and to provide the temporary privacy address to the destination, in place of a primary address associated with the calling party, as a calling station address in connection with connecting the call;

assigning the temporary privacy address to the calling party, wherein the temporary privacy address is assigned in response to the call request and prior to connecting the call;

informing the calling party, at the time of the call, of the temporary privacy address that has been assigned; and connecting the call, including by providing the temporary privacy address to the destination as the calling station address; and sending a notification if a subsequent call is placed to the temporary privacy address at a time when the temporary privacy address is no longer valid.

12. The system as in claim 10, wherein the processor is further configured to register the temporary privacy address with a location service.

13. The system as in claim 10, wherein the processor is further configured to map the temporary privacy address to a primary or other address associated with the calling party.

14. The system as in claim 10, wherein the prescribed event includes one or more of the following: a predetermined time, a predetermined date, a predetermined time and date, completion of a sale or other transaction, and receipt of a notification from the call participant.

15. The system as in claim 10, wherein the processor is further configured to apply a policy associated with the temporary privacy address.

16. The system as in claim 10, wherein a subsequent call placed to the temporary privacy address is routed to voice mail.

17. The system as in claim 10, wherein the processor is further configured to route to voice mail a subsequent call placed to the temporary privacy address if it is determined that the temporary privacy address is no longer valid.

18. The system as in claim 10, wherein a subsequent call placed to the temporary privacy address is routed to a primary or other address associated with the calling party.

* * * * *